US009707508B2

(12) United States Patent
Heldebrant et al.

(10) Patent No.: US 9,707,508 B2
(45) Date of Patent: Jul. 18, 2017

(54) SYSTEM AND PROCESS FOR POLARITY SWING ASSISTED REGENERATION OF GAS SELECTIVE CAPTURE LIQUIDS

(75) Inventors: David J. Heldebrant, Richland, WA (US); Ward E. Tegrotenhuis, Kennewick, WA (US); Charles J. Freeman, West Richland, WA (US); Michael L. Elliott, Kennewick, WA (US); Phillip K. Koech, Richland, WA (US); Paul H. Humble, Kennewick, WA (US); Feng Zheng, Richland, WA (US); Jian Zhang, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 1338 days.

(21) Appl. No.: 13/224,680

(22) Filed: Sep. 2, 2011

(65) Prior Publication Data

US 2013/0056676 A1 Mar. 7, 2013

(51) Int. Cl.
*B01D 53/02* (2006.01)
*B01D 53/14* (2006.01)

(52) U.S. Cl.
CPC ..... *B01D 53/1425* (2013.01); *B01D 53/1475* (2013.01); *B01D 53/1481* (2013.01); *B01D 53/1493* (2013.01); *B01D 2252/30* (2013.01); *B01D 2257/308* (2013.01); *B01D 2258/0233* (2013.01); *B01D 2258/0283* (2013.01); *Y02B 30/52* (2013.01); *Y02C 10/06* (2013.01); *Y02P 20/129* (2015.11)

(58) Field of Classification Search
CPC .......... B01D 53/1425; B01D 53/1475; B01D 53/1481; B01D 53/1493; B01D 2252/30; B01D 2257/308; B01D 2258/0233; B01D 2258/0283; B01D 53/1487; B01D 2257/504; Y02C 10/06; Y02B 30/52
USPC ....................................... 252/184
See application file for complete search history.

(56) References Cited

U.S. PATENT DOCUMENTS

| 3,161,461 | A | * | 12/1964 | Deal, Jr. et al. | 423/228 |
| 3,284,162 | A | * | 11/1966 | Deal, Jr. et al. | 423/242.7 |
| 7,799,299 | B2 | | 9/2010 | Heldebrant et al. | |
| 8,652,237 | B2 | * | 2/2014 | Heldebrant | B01D 53/1425 |
| | | | | | 423/220 |
| 2008/0058549 | A1 | | 3/2008 | Jessop et al. | |
| 2009/0220397 | A1 | * | 9/2009 | Heldebrant et al. | 423/210 |
| 2010/0319540 | A1 | * | 12/2010 | Garcia Andarcia et al. | 95/180 |

FOREIGN PATENT DOCUMENTS

WO 2012082203 A1 6/2012

OTHER PUBLICATIONS

Koech et al. "Chemically selective gas sweetening without thermal-swing regeneration" Energy Environ. Sci., 2011, 4,1385-1390 Mar. 11, 2011.*
Invitation to Pay Additional Fees and, Where Applicable, Protest Fee and Communication Relating to the Results of the Partial International Search for International Application No. PCT/US2012/043387, International Filing Date Jun. 20, 2012, Date of Mailing, Sep. 14, 2012.
Notification of Transmittal of the International Search Report and the Written Opinion of the International Searching Authority for International Application No. PCT/US2012/043387, International Filing Date Jun. 20, 2012, Date of Mailing Nov. 29, 2012.
Koech, P. K., et al., Chemically selective gas sweetening without thermal-swing regeneration, Energy and Environmental Science, 2011, 4, 1305-1390.
Jessop, P. G., et al, Green Chemistry—Reversible Nonpolar-to-Polar Solvent, Nature, 2005, 436 (7054), 1102-1102.
Heldebrant, D. J., et al., Reversible Zwitterionic Liquids, The Reaction of Alkanol Guanidines, Alkanol Amidines and Diamines with CO2, Green Chem. 2010, 12, 713-721.
Heldebrant, D. J. et al, Performance of Single-Component CO2-Binding Organic Liquids (CO2BOLs) for Post Combustion CO2 Capture, Chem. Eng. J. 2011, 171, 794-800.
Heldebrant, D. J., et al., Organic liquid CO2 Capture Agents with High Gravimetric CO2 Capacity, Energy Env. Sci. 2008, 1, (4), 487-493.
Phan, L., et al., Switchable Solvents Consisting of Amidine/Alcohol or Guanidine/Alcohol Mixtures, Ind. Eng. Chem. Res. 2008, 47, (3), 539-545.
Bates, E. D., et al, CO2 Capture by a Task-Specific Ionic Liquid, J. Am. Chem. Soc. 2002, 124, (6), 926-972.
Gurkan, B. E., et al., Equimolar CO2 Absorption by Anion-Functionalized Ionic Liquids, J. Am. Chem. Soc. 2010, 132, (7), 2116-2117.
Wang, C., et al, Reversible and Robust CO2 Capture by Equimolar Task-Specific Ionic Liquid-Superbase Mixtures, Green Chem. 2010, 12, 870-874.
Blasucci, V., et al., One-Component, Switchable Ionic Liquids Derived From Siloxylated Amines, Chem. Com. 2009, (1), 116-118.
Blasucci, V., et al., Single Component, Reversible Ionic Liquids for Energy Applications, Fuel 2010, 89, 1315-1319.
Heldebrant, D. J., et al., A Reversible Zwitterionic SO2-Binding Organic Liquid, Energy Environ. Sci. 2010, 3, 111-113.
Heldebrant, D. J.., et al., Reversible Uptake of COS, CS2 and SO@: Ionic Liquids with O-alkylxanthate, O-alkylthiocarbonyl and O-alkylsulfite Anions, Chem. Eur. U. 2009, 15, (31), 7619-7627.
Koech, P. K, et al., Chemically Selective Gas Sweetening Without Thermal-Swing Regeneration, E. Env. Sci. 2011.

(Continued)

*Primary Examiner* — Amina Khan
(74) *Attorney, Agent, or Firm* — James D. Matheson

(57) ABSTRACT

A polarity swing-assisted regeneration (PSAR) process is disclosed for improving the efficiency of releasing gases chemically bound to switchable ionic liquids. Regeneration of the SWIL involves addition of a quantity of non-polar organic compound as an anti-solvent to destabilize the SWIL, which aids in release of the chemically bound gas. The PSAR decreases gas loading of a SWIL at a given temperature and increases the rate of gas release compared to heating in the absence of anti-solvent.

20 Claims, 6 Drawing Sheets

(56) References Cited

OTHER PUBLICATIONS

Hottovy, J. D., et al., Three-Phase Liquid-Liquid-Vapor Equilibriums Behavior of Certain Binary Carbon Dioxide-n-Parafin Systems, J. Chem. Eng. Data 1981, 26, (3), 26=56-258.
Deye, J. F., et al., Nile Red as a Solvatochromaic Dye for Measuring Solvent Strength in Normal Liquids and Mixtures of Normal Liquids with Supercritical and Near Critical Fluids, Anal. Chem. 1990, 62, 615-622.
Phan, L., et al., Switchable Solvents Consisting of Amidine/Alcohol or Guanidine/Alcohol Mixtures, Ind. Eng. Chem. Res. 2008, 47, 539-545.
McDaniel, D. H., et al., Hydrogen Sulfide-Hydrosulfide Anion Interactions, Inorg. Chem., 1966, 5, (12), 2180-2181.
Maddux, R. N., et al., Reaction sof Carbon Dioxide and Hydrogen Sulfide with Some Alkanolamines, Ind. Eng. Chem. Res., 1987, 26, 27-31.
Koga, K., et al., IR Spectra of H2S isolated in free-standing crystals of Kr and Ex, Chem. Phys. Lett. 1998, 293, 180-184.
Halliday, J. D., et al., The reaction of trimethylamine in liquid hydrogen sulphide: an electrical conductivity study, Can. J. Chem., 1983, 61, 1142-1145.
Jou, F. Y., et al., Solubility of Methane Methyldiethanolamine, J. Chem. Eng. Data, 2006, 51, 1429-1430.
Jessop, P. G., et al., Switchable solvent systems for catalysis and catalyst recovery, Abstracts of Papers of the American Chemical Society, 2005, 299, U-971-U-971.

\* cited by examiner

SYSTEM AND PROCESS FOR POLARITY SWING ASSISTED REGENERATION OF GAS SELECTIVE CAPTURE LIQUIDS

STATEMENT REGARDING RIGHTS TO INVENTION MADE UNDER FEDERALLY-SPONSORED RESEARCH AND DEVELOPMENT

This invention was made with government support under Contract DE-AC05-76RL01830, awarded by the U.S. Department of Energy. The government has certain rights in the invention.

FIELD OF THE INVENTION

The present invention relates generally to switchable (reversible) ionic liquids and chemical capture thereon of unwanted acid gases from industrial (e.g., pre- and post-combustion) gas streams and natural gas streams (e.g., from gas wells). More particularly, the invention is a polarity swing-assisted regeneration (PSAR) process that releases chemically bound capture gases from SWILS and gas-binding organic liquids for regeneration thereof.

BACKGROUND OF THE INVENTION

Aqueous amine capture technologies are a benchmark for comparing performance of chemically-selective $CO_2$ capture solvents, as aqueous amine capture liquids are currently the only technology operating for industrial-scale gas purifications. $CO_2$ is separated from various gas streams in industrial processes including emissions from coal-fired power plants, gasification plants, cement kilns, and natural gas wells. However, aqueous-based capture liquids are inefficient energy processes for capture and release of gases due to the high temperatures (~120° C.) needed to thermally regenerate the capture liquid. The high regeneration temperature is exacerbated by the high specific heat of water. One strategy to improve the efficiency of chemically-selective capture sorbents is to replace the aqueous system with an aft-organic system. Organic systems have lower specific heats than water-based systems and can provide potentially greater capacities for gas capture. Still, use of new capture solvents in industrial processes will remain limited unless unfavorable energy economics and high energy costs associated with regeneration can be addressed. Accordingly, new regeneration processes are needed that have favorable energy economics that control loading and release of acid gases from gas streams and emission sources that do not have the drawbacks of aqueous-based systems, or the high costs associated with conventional physical adsorbents and conventional capture technologies.

SUMMARY OF THE INVENTION

The present invention includes a polarity swing-assisted regeneration (PSAR) process for regenerating switchable ionic liquid (SWIL) capture solvents. The process includes heating the SWIL in the presence of an anti-solvent (AS) at a selected desorption temperature to release a quantity of at least one chemically bound gas from the SWIL to regenerate the SWIL. A SWIL forms when a base and a weak acid chemically bind with an acid gas in a non-polar capture solvent. In various embodiments, acid gases captured in concert with the present invention include, but are not limited to, e.g., $CO_2$, COS, $CS_2$, $SO_2$, $SO_3$, including combinations of these various gases. The "ionic liquid" refers to a salt that is a liquid at room temperature. The terms "switchable" or "reversible" mean the capture liquid can take two forms, a non-polar (i.e., gas-lean) form and a polar ionic liquid (i.e., gas-rich or SWIL) form. In its non-ionic (gas-lean) form, the capture solvent is typically a non-polar liquid. The non-ionic (gas-lean) form, after chemically binding with an acid gas, forms a polar (gas-rich) ionic liquid. Polarity of the capture solvent is thus a function of the extent of chemical uptake of acid gas and the amount of each of the polar ionic liquid and non-polar forms present in the capture liquid. The quantities of each of the polar ionic liquid and non-polar forms of the capture solvent (liquid) are governed by reaction equilibria. "Regeneration" is the process that readies the capture solvent for future uptake (and thus chemical capture) of acid gases from various gas streams. "Regeneration" as defined herein means release of a quantity of at least one chemically bound acid gas from the SWIL (gas-rich form). Regeneration restores a corresponding quantity of the non-ionic (gas-lean) form of the capture liquid. In some embodiments, regeneration includes contacting a switchable ionic liquid (SWIL) with an anti-solvent to destabilize the SWIL. The "anti-solvent" (AS) is a second solvent composed of a non-polar organic compound, e.g., a liquid or a gas. Addition of, or contact with, the non-polar "anti-solvent" destabilizes the SWIL by decreasing the solvent polarity (the so-called "polarity swing"). "Destabilization" as defined herein means the equilibrium of the reverse reaction is shifted toward the non-polar (gas-lean) form of the capture solvent when the SWIL or GasBOL is contacted or mixed with the AS. Contact with AS thus aides the release of the chemically bound gas from the SWIL. "Loading Capacity" or "Working Capacity" of the capture solvent is defined as the ratio of the quantity of captured gas at a given temperature divided by the quantity of capture solvent (i.e., SWIL or GasBOL). In various embodiments, release of the capture gas requires addition of heat to the capture solvent at a selected desorption temperature. Regeneration readies the capture solvent for additional or future uptake of acid gases. The extent of gas release (and thus regeneration) is controlled by the SWIL's polarity. In various embodiments, destabilization (i.e., polarity shift) that aids release of the chemically bound gas that regenerates the capture solvent occurs at various temperatures or pressures at or above ambient. PSAR can thus be used to release chemically bound gases from any switchable ionic liquid. In some embodiments, regeneration is complete, meaning the capture solvent is completely transformed from the polar ionic liquid (SWIL) (capture gas-rich) state to the non-polar (gas-lean) state. In some embodiments, regeneration is partial, meaning only a portion of the capture solvent is transformed from the polar ionic liquid (SWIL) (capture gas-rich) state to the non-polar (gas-lean) state. As such, only a portion of the captured gas is released from the SWIL. The extent of regeneration is defined by the ratio of the forward (gas capture) reaction equilibrium, and the reverse (gas release) reaction equilibrium described further herein. Regeneration, whether partial or complete, readies the capture solvent for capture of additional acid gases. In some embodiments, the regeneration includes heating the capture solvent at a temperature below 120° C. In some embodiments, regeneration includes heating the capture solvent at a temperature below 75° C. In some embodiments, regeneration includes heating the capture solvent with a geothermal heat source. In some embodiments, regeneration includes heating the capture solvent with a solar heat source. In some embodiments, regeneration includes hearing the capture solvent with heat from a waste heat source. In some embodiments, regeneration includes heating with steam delivered from a steam source. In some embodiments, the steam source is a low-pressure steam source that delivers steam at a pressure above about 1.07 psia. In some embodiments, the steam source is an intermediate-pressure steam source that delivers steam at a pressure above about 5.6 psia. In some embodiments, the steam source is a high-pressure steam source that delivers steam at a pressure above about 29.82 psia. In some embodiments, the steam source is a condenser. In some embodiments, regeneration includes recovering heat from an absorber. In some embodiments, regeneration includes recovering heat from the regenerated (gas-lean) solvent. In some embodiments, regeneration includes recovering heat from an overhead condenser of a regenerator. In some embodiments, regeneration includes recovering heat from a flue gas cooler. In some embodiments, regeneration includes transferring heat with a heat pump to one or more of: a condenser, an evaporator, an absorber, a cooler, a separator, a regenerator, or a reboiler. In some embodiments, regeneration includes passing the SWIL through the AS. In some embodiments, regeneration includes passing the SWIL through a packed bed of immobilized AS or a solid AS.

In various embodiments, the SWIL regenerated in concert with the invention includes, but is not limited to, e.g., $CO_2BOLS$, COSBOLS, $SO_2BOLs$, $CS_2BOLs$, $SO_3BOLs$, tertiary alkanolamines, alkylcarbonates, primary and secondary carbamates, including combinations of these various capture solvents. In various embodiments, SWILs that capture acid gases include, but are not limited to, e.g., switchable carbamates (in which the amine is both the base and weak acid), and alkylcarbonate SWILs (in which the base is an amidine or a guanidine, and an alcohol (R—OH) serves as the weak acid). Here, R is any organic constituent or moiety having a suitable alcohol functionality or group. Alcohols include, but are not limited to, linear, branched, or aromatic alcohols. Exemplary linear alcohols include, but are not limited to, e.g., propanol, butanol, pentanol, hexanol, and like alcohols. Exemplary branched alcohols include, but are not limited to, e.g., neopentanol, isopropyl alcohol, and like alcohols. Exemplary aromatic alcohols include phenols, and like alcohols. Combinations of these various alcohols may likewise be used. No limitations are intended. In some embodiments, the SWIL includes cationic and anionic charges that are on the same molecule of the SWIL. Examples of this class of SWILs include, but are not limited to, e.g., alkanol amidines, alkanol guanidines, diamines, tertiary alkanol amines, including combinations of these various moieties. In some embodiments, the SWIL includes cationic and anionic charges that are on different molecules of the SWIL. Examples of this class of compounds include alkyl carbonates, carbamates, thiols, phosphazenes, and combinations of these various compounds. Cations of this class of SWILs include, but are not limited to, e.g., amidinium (generated, e.g., by combining an amidine +an alcohol (R—OH); an amidine+an amine; an amidine+a primary amine; an amidine+a secondary amine, including combinations of these various moieties); and guanidinium (generated, e.g., by combining, e.g., a guanidine+an alcohol; a guanidine+an amine; a guanidine+a primary amine; a guanidine+a secondary amine, including combinations of these various moieties). Anions of this class of SWILs include, but are not limited to, e.g., carbonates, alkyl carbonates (formed, e.g., by a reaction between an alcohol (R—OH)+$CO_2$), and carbamates (formed, e.g., by a reaction between an amine+$CO_2$). No limitations are intended by the disclosure of these exemplary species. All switchable ionic liquids (SWILs) are within the scope of the invention.

In some embodiments the anti-solvent is selected from non-polar organic compounds including, but not limited to, e.g., non-polar alkane hydrocarbons with a carbon number greater than 1; non-polar aromatic hydrocarbons; non-polar ethers [R—O—R]; non-polar glymes [(R—O—R)$_n$]; non-polar alcohols (R—OH); non-polar aliphatic alcohols; tetraalkylsilanes [$Si_{R4}$]; non-polar waxes, non-polar aprotic solvents, non-polar protic solvents, and combinations thereof. In some embodiments the anti-solvent is a non-polar organic compound including, but not limited to, e.g., hexanes; fatty acid esters, siloxanes, waxes, non-polar alcohols; other non-polar polymers including, but not limited to, e.g., polyethylene, polypropylene, polystyrene, polysiloxane, polysilane, fluorine-containing polymers (e.g., TEFLON®), including combinations of these various compounds. In some embodiments, the anti-solvent is immobilized or grafted on a solid support. Examples of immobilized supports include, but are not limited to, e.g., polymers, ionic liquids, silicates, metal organic frameworks and combinations thereof. In some embodiments, the anti-solvent is a solid. Examples of solid anti-solvents include but are not limited to organic and inorganic ordered structures such as silicates, metal organic frameworks and combinations thereof. In some embodiments, the anti-solvent has a concentration defined by a mole fraction between about 0.05 and about 0.75. In some embodiments, the anti-solvent has a concentration defined by a mole fraction between about 0.4 and about 0.5. In some embodiments, the anti-solvent increases the rate of release of chemically bound gas from the SWIL compared with release from the SWIL absent the anti-solvent. In some embodiments, the anti-solvent decreases the loading capacity of chemically bound gas on the SWIL at a given temperature compared with the loading capacity absent the anti-solvent.

In various embodiments, polarity swing-assisted regeneration regenerates chemically-selective gas binding organic liquids (BOLs). In some embodiments, the method regenerates a $CO_2$-selective BOL by aiding release of chemically bound $CO_2$ from the $CO_2BOL$ (SWIL). In some embodiments, polarity swings force regeneration of the SWIL at lower temperatures (e.g. below 75° C.) than those regenerated with thermal heating alone (e.g., 120° C.). In various embodiments, polarity swing-assisted regeneration allows for unique engineering processes and flow diagrams for industrial processes (e.g., coal fired power plants). In some embodiments, regeneration improves energy efficiency of release of acid gases from SWIL materials. In some embodiments, regeneration improves energy efficiency of release of $CO_2$ gas from a $CO_2BOL$ (SWIL). In some embodiments, the process employs a non-polar anti-solvent that destabilizes the SWIL.

In some embodiments, the non-polar anti-solvent is mixed with the $CO_2BOL$ ($CO_2$-rich) solvent (e.g., alkylcarbonate salt) to destabilize the $CO_2BOL$, which aides release of $CO_2$ permitting regeneration at temperatures at or below 75° C. These temperatures are lower than regeneration and release of bound gas observed solely using thermal heating (120° C.). In this process, addition of an anti-solvent destabilizes the SWIL, which enhances releases of chemically bound $CO_2$. $CO_2$ is released from a switchable ionic liquid through destabilization of the alkylcarbonate salt by means of a polarity switch controlled by the addition of a non-polar solvent to the $CO_2$-loaded alkylcarbonate. The destabilization effect upon addition of the AS enhances $CO_2$ release, increasing the rate and degree of $CO_2$ release from the switchable ionic liquid (i.e., the CO$_2$BOL form of the liquid). Regeneration shifts the equilibrium toward the alkyl amine, or BOL, form of the capture solvent.

In some embodiments, the PSAR process includes separating the anti-solvent from the regenerated SWIL. In various embodiments, the separation includes one or more processes including, but not limited to, e.g., centrifuging, coalescing, gravity separating, heating (e.g., distilling), decanting, solvent extracting, freezing, cooling, boiling, and combinations of these various processes. In some embodiments, separation of the anti-solvent from the regenerated SWIL capture solvent involves use of devices including, but not limited to, e.g., coalescers, centrifuges, gravity separators, and decanters. In some embodiments, separation includes distilling the AS from the regenerated SWIL at a temperature below about 60° C. In some embodiments, separation of the anti-solvent from the regenerated SWIL is performed at a temperature below 40° C. In some embodiments, separation includes distilling the AS from the SWIL when the AS is more volatile than the regenerated SWIL. In some embodiments, separation includes distilling the regenerated SWIL when the SWIL is more volatile than the AS. In some embodiments, separation includes recovering the AS and the regenerated SWIL in separate phases or phase layers. In some embodiments, separation includes cooling the AS and regenerated SWIL mixture to a temperature sufficient to induce phase separation between the AS and the regenerated SWIL and recovering the separated phases. In some embodiments, separation includes pumping the SWIL through an immobilized anti-solvent and recovering the regenerated SWIL. In some embodiments, separation of the AS from the regenerated BOL includes distilling the anti-solvent or extracting the anti-solvent into a separate immiscible solvent. In other embodiments, separation includes freezing the AS by cooling to a temperature below the freezing point of the AS and separating the AS as a solid from the capture solvent. In other embodiments, separation includes phase-separating the AS and regenerated SWIL capture liquid into at least two layers and decanting the layer containing AS or decanting the layer containing the regenerated SWIL capture solvent to separate the two layers.

The invention also includes a polarity swing-assisted regeneration (PSAR) process for regenerating switchable ionic liquid (SWIL) capture solvents that includes releasing a quantity of one or more chemically bound acid gases including, but not limited to, e.g., CO$_2$, SO$_2$, SO$_3$, COS, or CS$_2$ from the switchable ionic liquid (SWIL) in contact with an anti-solvent (AS) at a selected desorption temperature below 120° C. that regenerates the SWIL.

The invention also includes a polarity swing-assisted regeneration (PSAR) system. The system includes: an absorber configured to 1) receive a non-polar form of a gas-selective binding solvent and 2) to release a switchable ionic liquid (SWIL) form thereof; a regenerator configured to receive the SWIL and to release the regenerated form thereof; and at least one heat pump configured to transfer the non-polar and SWIL forms of the solvent to/from the absorber, to/from the regenerator, and/or between the absorber and the regenerator. In various embodiments, the heat pump transfers heat collected from a condenser, an evaporator, an absorber, a cooler, a separator, a regenerator, a reboiler, including combinations of these various devices. In some embodiments, the regenerator operates at a desorption temperature at or below 120° C. In some embodiments, the regenerator operates at a desorption temperature at or below 75° C. In some embodiments, the heat pump collects heat from an evaporator and transfers the heat from a condenser to a regenerator. In some embodiments, the heat pump recovers heat from an absorber. In some embodiments, the heat pump transfers heat recovered from the regenerated solvent. In some embodiments, the heat pump transfers heat from an overhead condenser of a regenerator. In some embodiments, the heat pump transfers heat from a flue gas cooler.

DETAILED DESCRIPTION

Figure 1:
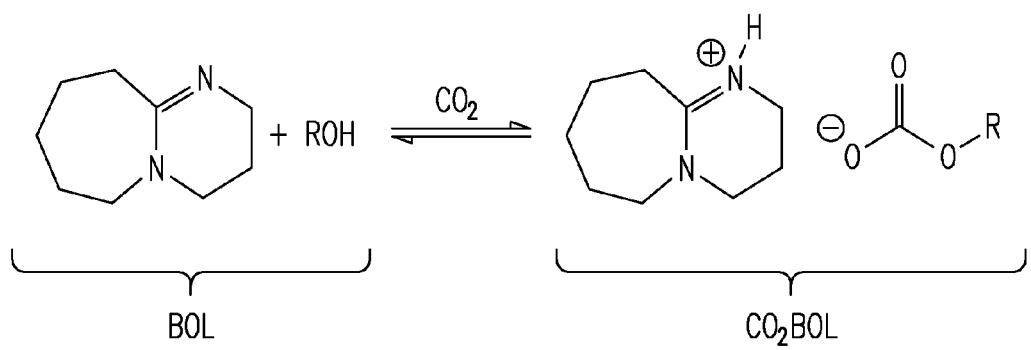
FIG. 1 illustrates an exemplary chemical gas-binding system, according to one embodiment of the invention.

A polarity swing assisted regeneration (PSAR) process is disclosed for regenerating switchable ionic liquid (SWIL) capture solvents. Switchable (reversible) ionic liquids allow selective gas capture with enhanced material performance. The process enhances energy economics of regeneration for these advanced gas capture solvents without the inherent drawbacks of aqueous-based systems or the high costs associated with conventional capture technologies. The lower specific heats associated with SWIL fluids means the thermal energy (e.g., BTU/lb captured gas) required to regenerate the capture solvent is lower by as much as 43%. The following description includes a preferred best mode of one embodiment of the present invention. It will be clear from this description that the invention is not limited to the illustrated embodiments but also includes a variety of modifications and embodiments thereto. For example, while the present invention will be described in reference to one class of SWILs, known as Binding Organic Liquid (BOL) solvents, the invention is not limited thereto. All switchable ionic liquid systems as will be deployed in the art in view of this disclosure are within the scope of the invention. Thus, no limitations are intended. Therefore, the present description should be seen as illustrative and not limiting. While the embodiments of the invention are susceptible of various modifications and alternative constructions, it should be understood, that there is no intention to limit the invention to the specific form disclosed, but, on the contrary, the invention is to cover all modifications, alternative constructions, and equivalents falling within the scope of the invention as defined in the claims.

All switchable ionic liquids (SWILs) include a non-polar (gas-lean) form that chemically reacts with acid gases to form the polar ionic liquid (gas-rich) form (SWIL) of the capture solvent. Hereafter, reactions with an exemplary class of SWILs known as gas-selective Binding Organic Liquids, or BOLs, will be described. When an acid gas is captured and chemically bound to the gas-selective BOL (originally in the non-polar or on-ionic form), the reaction yields the ionic liquid form of the binding liquid, i.e., a switchable ionic liquid (SWIL). The forward gas capture reaction [Gas+BOL→GasBOL] in which an acid gas in a gas stream is captured by a BOL to form a GasBOL (a SWIL), is governed by the forward equilibrium constant ($K^1$), as given by Equation [1]:

$$K^1 = \frac{[GASBOL]}{[GAS]*[BOL]} \quad [1]$$

The reverse reaction [GasBOL+Anti-Solvent (AS)→Gas+BOL] in which the chemically bound capture gas is released from the GasBOL (a SWIL) to form the non-polar Binding Organic Liquid (BOL) form of the capture solvent is governed by the reverse equilibrium constant ($K^{-1}$), as given by Equation [2]:

$$K^{-1} = \frac{[GAS]*[BOL]}{[GASBOL]*[AS]} \quad [2]$$

Quantities of ionic and non-ionic forms of the capture solvent are governed by an overall equilibrium constant ($K_{obs}$) defined by the ratio of the forward and reverse reaction equilibria [i.e., $K^1/K^{-1}$], given by Equation [3]:

$$K_{OBS}=[GASBOL]^2*[AS] \quad [3]$$

FIG. 1 shows an exemplary gas-selective BOL system for chemical capture and release of $CO_2$, according to one embodiment of the invention. In the exemplary system, the $CO_2$-selective BOL includes a mixture of a base [e.g., diazabicyclo[5.4.0]-undec-7-ene (DBU)] and an alcohol (R—OH) [e.g., 1-hexanol] mixed in a suitable ratio (e.g., 1:1). Base and alcohol (a BOL) chemically react with $CO_2$ to provide chemical binding of $CO_2$ (i.e., forming a $CO_2$BOL). When $CO_2$ is captured and chemically bound to the BOL, the BOL is converted from a non-polar organic liquid (BOL) form to a switchable (polar) ionic liquid form (GasBOL). Chemical binding of the $CO_2$ yields a liquid alkylcarbonate salt.

Acid Gases

In various embodiments, Polarity Swing Assisted Regeneration (PSAR) of the present invention aides release of acid gases captured from industrial gas streams including, e.g., pre-combustion and post-combustion gas streams from, e.g., coal-fired power plants, cement kilns, and other industrial gas streams; and natural gas streams (e.g., natural gas wells) thereby regenerating their respective capture solvents. Acid gases captured and released in concert with the invention include, but are not limited to, e.g., $CO_2$, COS, $CS_2$, $SO_2$, $SO_3$, including combinations of these various gases.

Switchable Ionic Liquids (SWILs) and Binding Organic Liquids (BOLs)

In various embodiments, the PSAR process of the present invention works on SWILs including, but not limited to, e.g., switchable carbamate ionic liquids, alkylcarbonates ($CO_2$BOL), alkylsulfites ($SO_2$BOL), alkylthiocarbonate (COSBOL); alkylxanthate ($CS_2$BOL) ionic liquids.

In some embodiments, the switchable ionic liquid includes cationic and anionic charges that are present on the same molecule of the switchable ionic liquid. Examples of this class of SWILs include, but are not limited to, e.g., alkanol amidines, alkanol guanidines, diamines, tertiary alkanol amines, and combinations thereof. In some embodiments, the SWIL includes cationic and anionic charges that are on different molecules of the SWIL. Examples of this class of SWILs include, but are not limited to, e.g., amidinium (formed, e.g., by mixing an amidine+an alcohol); guanidinium (formed, e.g., by mixing a guanidine+an alcohol (R—OH); a guanidine+an amine; a guanidine+a primary amine; a guanidine+a secondary amine, including combinations of these various combinations), thiols, phosphazenes, including combinations of these various compounds.

Anti-solvents

In various embodiments, Polarity Swing-Assisted Regeneration (PSAR) of gas-selective. SWILs, is effected by contact with, or introduction of, an anti-solvent (AS) that destabilizes the SWIL by decreasing the polarity of the solvent mixture. Addition of, or contact with, the non-polar organic AS destabilizes the SWIL by shifting the equilibrium from the ionic liquid form (gas-rich state) to the non-polar (gas-lean) state of the capture solvent, which releases chemically bound emission gas from the SWIL. Release of emission gases is thus controlled by the polarity of the capture solvent. The process is applicable only to regeneration of switchable ionic liquids (SWILs). In various embodiments, the anti-solvent is a non-polar organic compound including, but not limited to, e.g., non-polar alkane hydrocarbons with a carbon number greater than 1; non-polar aromatic hydrocarbons; non-polar ethers [R—O—R]; non-polar glymes [(R—O—R)$_n$]; non-polar alcohols (R—OH); non-polar aliphatic alcohols; tetraalkylsilanes [$SiR_4$]; non-polar waxes, non-polar aprotic solvents, non-polar protic solvents, and combinations thereof. In some embodiments the anti-solvent is a non-polar organic compound including, but not limited to, e.g., hexanes; alcohols; fatty acid esters, siloxanes, waxes, other non-polar polymers including, but not limited to, e.g., polyethylene, polypropylene, polystyrene, polysiloxane, polysilane, fluorine-containing polymers (e.g., TEFLON®), including combinations of these various compounds. In some embodiments, the AS effects at least partial release of the chemically-bound gas from the ionic liquid (gas-rich or chemically bound gas) form of the gas capture solvent. In some embodiments the anti-solvent is immobilized or grafted on a solid support, wherein the SWIL would be passed through the AS. Examples of immobilized supports include but are not limited to polymers, ionic liquids, silicates, metal organic frameworks and combinations thereof. In other embodiments the anti-solvent is a solid, wherein the SWIL would be passed through the AS. Examples of non-polar solid antisolvents include but are not limited to organic and inorganic ordered structures such as silicates, metal organic frameworks and combinations thereof. In various embodiments, the SWIL is contacted with a sufficient quantity of anti-solvent to reduce the polarity of the SWIL, which aids release of chemically bound acid gases (e.g. CO)$_2$ from the ionic liquid form of the SWIL. The destabilization effect achieved with introduction of a second solvent enhances release of the bound emission gas, which increases the rate and degree of gas release from the gas-rich ionic form of the switchable ionic liquid). In particular, this new solvent-based process couples unique attributes of non-aqueous, gas-selective Binding Organic Liquids (BOLs) with a newly discovered polarity-swing-assisted regeneration (PSAR) approach that is unique to switchable ionic liquids. "BOLs"

as the term is used herein is the non-polar (gas-lean) form of the capture solvent, "$CO_2BOL$" is the ionic (polar) form of the BOL after chemically binding with $CO_2$. Herein each gas trigger forms a specific BOL, i.e. $CO_2$ forms a $CO_2BOL$ and $SO_2$ forms a $SO_2BOL$. The release of the bound gas from the $CO_2BOL$ forms the BOL (non-ionic, non-polar), which regenerates the BOL and prepares it to again capture more of the selected gas.

In the present embodiment, the non-polar AS when introduced to the $CO_2BOL$, destabilizes the $CO_2BOL$, meaning the equilibrium is shifted such that the reverse reaction is favored. $CO_2$ can be released at a lower temperature (than conventional heating alone). Thus, the energy economics of the reverse (i.e., release) reaction are favored, which allows alternative and lower-grade heat sources in a powerplant to be considered for regeneration of the solvent in lieu of intermediate pressure steam or other higher cost forms of heat normally used to regenerate liquid solvents.

The PSAR process enhances the efficiency of regeneration of a SWIL because the lower temperature of regeneration unlocks the utilization of lower grade or alternative heating sources (such as waste condenser heat, heat from heat pumps) that are not efficient to regenerate solvents that require regeneration temperatures greater than 100° C. Thus, the efficiency of regeneration with a PSAR can be higher than regenerations of SWIL or aqueous amine solvent systems that require thermal heating by intermediate pressure steam (temperatures greater than 100° C.). The PSAR process is attractive from a retrofit standpoint in that a PSAR could be used as a bolt on retrofit because a power plant's steam cycle would not be interrupted or be reconfigured.

Heat Sources

In various embodiments, the polarity switch between the ionic and non-ionic forms of the capture solvent, in tandem with mild heating (that raises waste heat to a minimum use temperature) can be exploited to reduce the energy penalty associated with regeneration (that releases the acid gas) of SWIL capture fluids. In various embodiments, sources of waste heat include heat generated in processes including, but not limited to, e.g., Fisher-Tropsch processes, cement kiln processes, other waste heat processes, including combinations of these various waste heat processes.

PSAR and Water Content

The PSAR process of the invention works for gas capture materials that undergo a polarity shift. In some embodiments, presence of water in the capture solvent introduces higher thermal penalties for regeneration due to formation of thermodynamically stable salts. For example, bicarbonate salts formed in the solvent by capture of $CO_2$ are highly soluble in water and are unable to be destabilized by addition of an anti-solvent when the water content exceeds a certain threshold. Just as oil and water are immiscible, an anti-solvent cannot dissolve in water to change the polarity and aid in gas release. Bisulfite salts formed in the solvent by capture of other acid gases such as $SO_2$ or $SO_3$ are also unable to be destabilized by addition of an anti-solvent when reacted in the presence of water above a certain threshold. Thus, when using PSAR, water is preferably minimized to a quantity below about 1 molar equivalent.

In various embodiments, the invention process enhances $CO_2$ release from $CO_2BOLs$ in concert with anti-solvent destabilization of the chemically bound $CO_2$. In particular, the process improves energy efficiency of $CO_2$ capture from $CO_2BOL$ materials by utilizing a non-polar anti-solvent to destabilize the $CO_2BOL$ that aides release of $CO_2$ at temperatures far below those previously utilized for $CO_2BOLs$. Addition of anti-solvent swings the polarity of the solvent that forces increased release of the chemically bound $CO_2$ from the $CO_2BOLs$ at a given temperature, which enables regeneration of the gas-selective BOLs at a temperature lower than when no anti-solvent is used.

Figure 2:
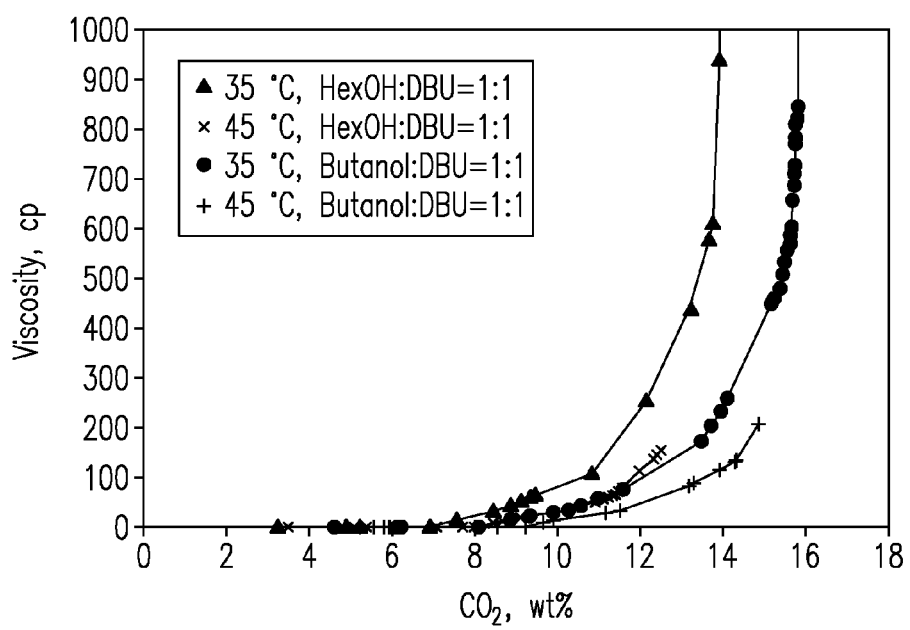
FIG. 2 plots viscosity as a function of gas loading for one embodiment of the invention.

FIG. 2 shows measured viscosity as a function of $CO_2$ loading for two respective $CO_2BOL$ solvents at two independent temperatures (35° C. and 45° C.). Temperatures are typical operating temperatures for absorbers in industrial applications. Switchable ionic liquids and functionalized ionic liquids are known to have non-linear behavior for $CO_2$ loading. Results show an acceptable performance is capable by controlling the temperature and $CO_2$ loading of a $CO_2BOL$. Here, each of the $CO_2BOL$ solvents are have viscosities lower than 20 Centipoise (Cp) up to 9.3% $CO_2$ loading by weight, indicating that viscosity can be held low while maintaining an acceptable 9% loading. Viscosities below 20 Centipoise (Cp) are preferred to assist the heat exchanger performance. Both of these $CO_2BOL$ examples are dual component systems, wherein the base and alcohol are separate components. Single component derivatives including, e.g., non-viscous alkanolamidines and alkanolguanidines can also be used. Thus, no limitations are intended to dual-component systems. Data indicate that $CO_2BOLs$ can also operate well at viscosities below 20 Centipoise (Cp) at temperatures of ~35-45° C. and a $CO_2$ loading below 9%.

Figure 3:
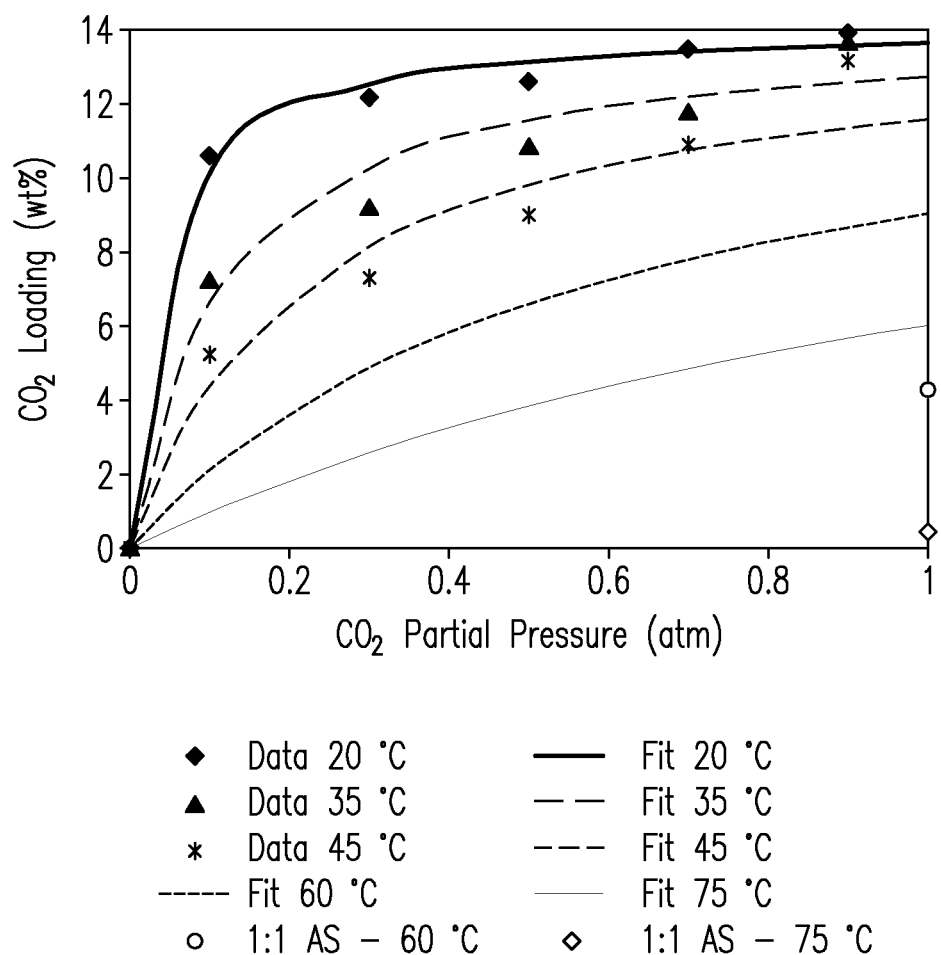
FIG. 3 shows gas loading isotherms as a function of gas partial pressure for one anti-solvent system at selected temperatures.

FIG. 3 shows gas loading isotherms for a $CO_2BOL$ system including a 1:1 molar ratio of [DBU:hexanol] that was contacted with a flow of $CO_2$-saturated nitrogen gas as a function of partial pressure at two selected temperatures. Heat of reaction of $CO_2$ binding was determined to be about −55.3 kJ/mol. Isotherm data provide an indication of the working capacity of the $CO_2BOL$. Relatively low temperature measurements were made due to volatility of the alcohol at temperatures greater than 45° C. Data were fit to a Clausius-Clapeyron equation to extrapolate the equilibrium loading to higher temperatures. The fit was validated by a single measurement at 60° C. and 1 atm partial pressure. In the figure, at a $CO_2$ pressure of 1 atm, two single data points for $CO_2$ (corresponding to anti-solvent regeneration data in TABLE 3 below) are also shown. The difference in the two data points gives the working capacity of the $CO_2BOL$ in the presence of anti-solvent. For example, at an absorption temperature of 45° C. and a regeneration temperature of 75° C., the working capacity of the $CO_2BOL$ in the presence of anti-solvent is about 6-7 wt % $CO_2$. Capacity data for the $CO_2BOL$ solvents are similar to capacities for conventional MEA capture solvents but regeneration temperatures are significantly lower. For example, to maximize the quantity of $CO_2$ that is thermally released without anti-solvent addition, temperatures of 120° C., at 1 atm, are required. Addition of anti-solvent yields a similar release of $CO_2$ but at a temperature 45 degrees lower, e.g., 75° C. or below.

Absorption temperatures for uptake of capture gas are preferably selected near the ambient air temperature or ambient cooling water temperature of the selected industrial process. Absorption temperature for tests conducted herein was selected due to the high uptake of acid gas at that temperature and the lower swing temperature (ΔT) needed for desorption. In general, lower swing temperatures are preferred so that efficiency of heat transfer is maximized and energy penalties associated with heat transfer are minimized in industrial processes. However, all absorption and desorption temperatures as will be selected by those of ordinary skill in the art in view of the disclosure are within the scope of the invention. No limitations are intended.

Polarity $CO_2BOLs$ undergo a polarity swing that assists in the decarboxylation of the chemically bound $CO_2$ from $CO_2BOL$ alkylcarbonates. There is a significant polarity swing available to $CO_2BOLs$ because the $CO_2$-free (non-polar) form of most $CO_2BOLs$ are as polar as dimethylformamide (DMF), but become slightly more polar than methanol once $CO_2$ is chemically bound to the $CO_2BOL$. TABLE 1 lists polarities measured for some $CO_2BOLs$ ($CO_2$-lean and $CO_2$-rich) and some potential anti-solvents.

TABLE 1

Exemplary polarities of $CO_2BOLs$; $CO_2$ lean/rich, and representative anti-solvents.

| Solvent | $\lambda_{max}$ (nile red) (nm)[a] |
|---|---|
| Ether | 504.4[b] |
| Methanol | 549.6[b] |
| DMF | 541.2[b] |
| DBU-1-Propanol | 542[c] |
| DBU-1-propanol + $CO_2$ | 553[c] |

[a]Polarities of BOL constituents, with and without $CO_2$ present, were measured in concert with Nile Red, a solvatochromatic dye that indicates polarity by changes in the $\lambda_{max}$.
[b]Deye et al., Anal. Chem. 1990, 62, 615-622.
[c]Jessop et al., Ind. Eng. Chem. Res., 2008, 47, 539-545.

Most SWILs (including $CO_2BOLs$) exhibit polarity swings that are high enough to be significantly affected by the introduction of a second solvent. Generally, the ionic form of the SWIL is immiscible with non-polar solvents such as hexanes, and likewise the non-polar form is immiscible with polar solvents such as methanol. The non-polar anti-solvent destabilizes the ionic liquid form of the BOL (i.e., the alkylcarbonate salt of the $CO_2BOL$) and shifts the equilibrium to the left (see FIG. 1), which assists in the release of $CO_2$. PSAR of the present invention differs from Anti-Solvent Swing Regeneration (ASSR) described in co-pending U.S. application Ser. No. 12/972,125 filed 17 Dec. 2010. ASSR provides complete stripping of $H_2S$ and regeneration of hydrogen sulfide binding organic liquids ($H_2SBOLs$) at STP. $H_2SBOLs$ are switchable hydrosulfide ionic liquids formed between $H_2S$ and anhydrous tertiary alkanolamines. Addition of hexanes (AS) to the $H_2S$-rich amine removed 97% of the $H_2S$ at 25° C. Regeneration is complete because $H_2S$ is immiscible in the solvent once anti-solvent is added. No heat energy is required. PSAR of the present invention requires some heat energy to overcome the endothermic release of acid gas (e.g., $CO_2$) and to increase the solubility of the non-polar anti-solvent in the capture solvent (e.g., $CO_2BOL$). $CO_2BOLs$ (and other BOLs described herein) do not undergo complete (>95% gas release by weight) swing assisted regeneration at STP as do hydrosulfide ionic liquids ($H_2SBOLs$) due to the relative strength of alkylcarbonate salts (−55 kJ/mol) compared to weak hydrosulfide salts of $H_2SBOLs$ (<−15 kJ/mol).

Rate Enhancement

Figure 4:
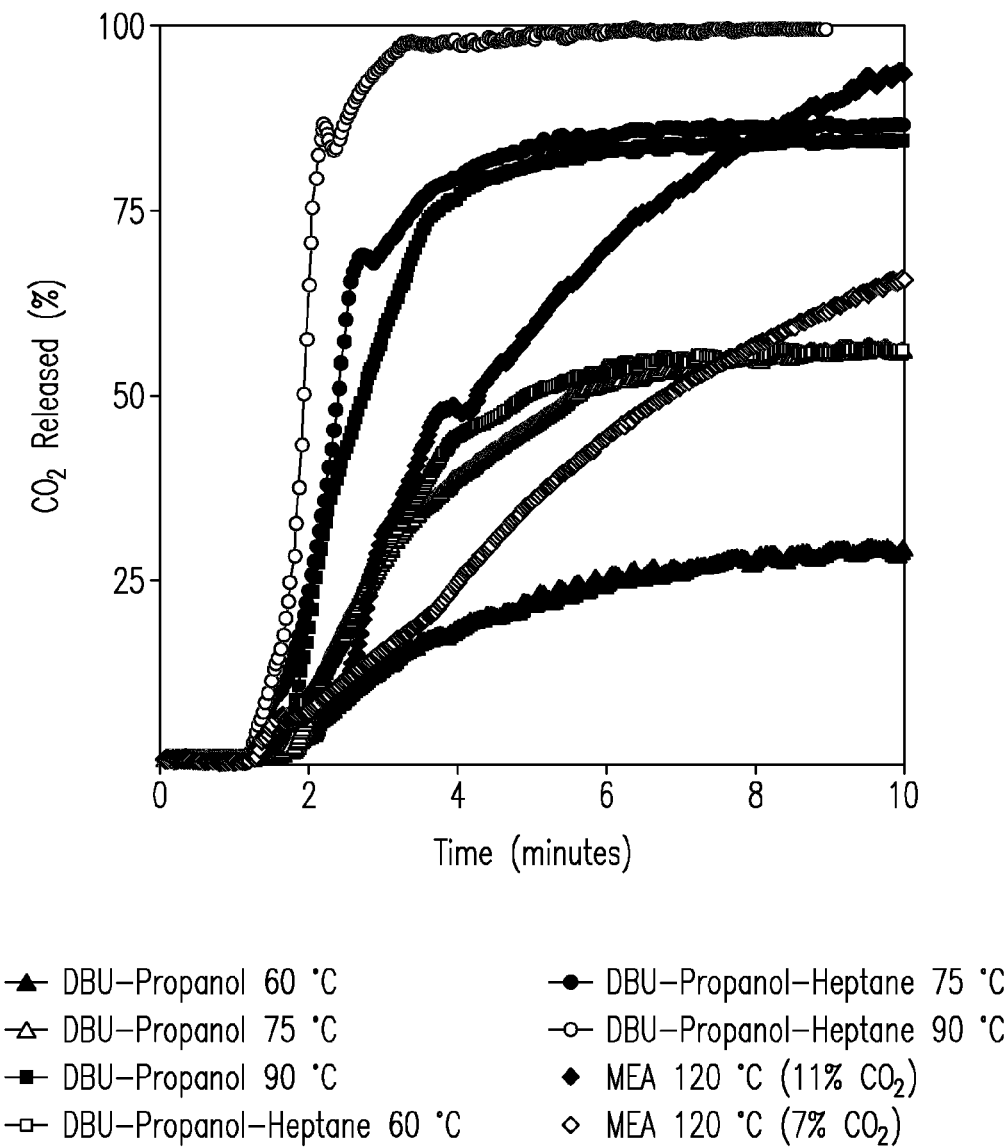
FIG. 4 shows gas release with and without addition of anti-solvent for one embodiment of the invention.

The enhancement in the rate and quantity of $CO_2$ released from $CO_2BOLs$ was measured using an automated gas burette system described, e.g., by Zheng et al. ("Automated Gas Burette System for Evolved Hydrogen Measurements." Rev. Sci. Instr. (2008), (79), 084103]. $CO_2$ release rates for $CO_2BOL$ solvent combinations were quantified for the equilibrium measurements. Release rates for a 30 wt % MEA solution were also measured so that the results could be compared. Each solvent was first loaded with $CO_2$ by sparging with a pure gas. Next, each sample container was immersed into a constant temperature bath. Anti-solvent was added for certain experiments just prior to increasing the temperature. $CO_2$ release rates were quantified by the measured gas volume emitted from each sample, over time. The PSAR effect with $CO_2$ was performed with a DBU-propanol $CO_2BOL$ with heptane as an example anti-solvent at several different temperatures and heptane loadings. FIG. 4 presents results. In the figure, $CO_2$ release profiles from DBU and 1-propanol loaded to 85% capacity (13.7 wt % $CO_2$) show first order release profiles, with the degree of $CO_2$ release dependent on temperature. Addition of one molar equivalent of anti-solvent (heptane) to DBU and 1-propanol loaded with $CO_2$ increases the amount of $CO_2$ released at a given temperature. Data show addition of anti-solvent increases the amount of $CO_2$ released at a given temperature. For example, with anti-solvent, the $CO_2$ release rate at 60° C. matches the $CO_2$ release rate at 75° C. with no anti-solvent. Similarly the total $CO_2$ release rate with anti-solvent at 75° C. slightly exceeds the profile at 90° C. without anti-solvent. With the presence of anti-solvent, complete $CO_2$ release is observed at 90° C. In the absence of anti-solvent, complete $CO_2$ release is observed at 120° C. TABLE 2 shows a peak (or maximum) rate of $CO_2$ release from these experiments.

TABLE 2

$CO_2$ maximum release rates, with and without anti-solvent, from DBU-propanol initially loaded to 13.7 wt %.

| Solvent (Preloaded with $CO_2$) | Regeneration Temperature (° C.) | Maximum $CO_2$ Release Rate [mmol/min] |
|---|---|---|
| DBU-PrOH (1:1 on a molar basis), no anti-solvent added at regeneration | 60 | 0.6 |
| | 75 | 1.2 |
| | 90 | 2.0 |
| DBU-PrOH (1:1 on a molar basis); 1:1 molar heptanes (to DBU) anti-solvent added at regeneration | 60 | 0.9 |
| | 75 | 2.0 |
| | 90 | 20 |
| MEA (30 wt % solution)* | 120 | 1.0 |

*Reference measurement included for 30% MEA loaded at 7 wt % $CO_2$.

In the table, DBU-propanol, with no anti-solvent, had a maximum $CO_2$ release rate of 1.2 mmol/min at 75° C. Results compare with a release rate from the MEA sample of 1.0 mmol/min at 120° C. By adding anti-solvent, release rate from DBU-propanol at 75° C. nearly doubled to 2.0 mmol/min. Measurements indicate comparable gas release rates to conventional MEA at a lower regeneration temperature (i.e., 75° C. vs 120° C.). TABLE 3 lists $CO_2$ loadings with respect to anti-solvent loading.

TABLE 3

CO₂ loading profiles, with and without AS, from DBU-propanol initially loaded to 13.7 wt %.

| Molar Ratios of Antisolvent (Heptane):DBU:Propanol | Mass of Antisolvent (% of total DBU-Propanol mass) | CO₂ Loading in BOL (wt %) at: | | | | | |
|---|---|---|---|---|---|---|---|
| | | 25° C. | 45° C. | 60° C. | 75° C. | 90° C. | 120° C. |
| 0:1:1 | 0% | 13.7% | 12.7% | 9.9% | 8.6% | 1.8% | 0.0% |
| 1:1:1 | 47% | | 10.8% | 5.0% | 0.5% | 0.5% | |
| 2:1:1 | 94% | | | 4.1% | | | |
| 0.5:1:1 | 24% | | | | 2.3% | | |

All samples were initially loaded under a pressure of 1 atm of $CO_2$ to 13.7 wt % $CO_2$ at 25° C. $CO_2$ release was quantified by immersing the loaded solvent in a temperature-controlled bath and measuring the volume of released gas. With no anti-solvent addition, total releases of loaded $CO_2$ were 22%, 33%, 80%, and 100% at temperatures of 60° C., 75° C., 90° C. and 120° C., respectively. However, introduction of heptane anti solvent at a 1:1 molar ratio to DBU, $CO_2$ release increased to 58% at 60° C. and nearly 100% at 75° C., 90° C., and 120° C., respectively. Several tests at higher anti-solvent ratios suggested a diminishing return at ratios exceeding a 1:1 molar loading. In the table, at 120° C. with no anti-solvent present, loading capacity of the capture solvent is 13.7 wt % $CO_2$ (13.7 wt % minus 0.0 wt %). At 90° C. with no anti-solvent present, loading capacity of the capture solvent is 11.9 wt % $CO_2$ (13.7 wt % minus 1.8 wt %). However, in the presence of anti-solvent, loading capacity of the capture solvent at 90° C. is 13.2 wt % $CO_2$ (13.7 wt % minus 0.5 wt %). Results show that addition of anti-solvent increases the working capacity of the gas-selective capture solvent at temperatures below 120° C.

Recycling Capacity

Figure 5:
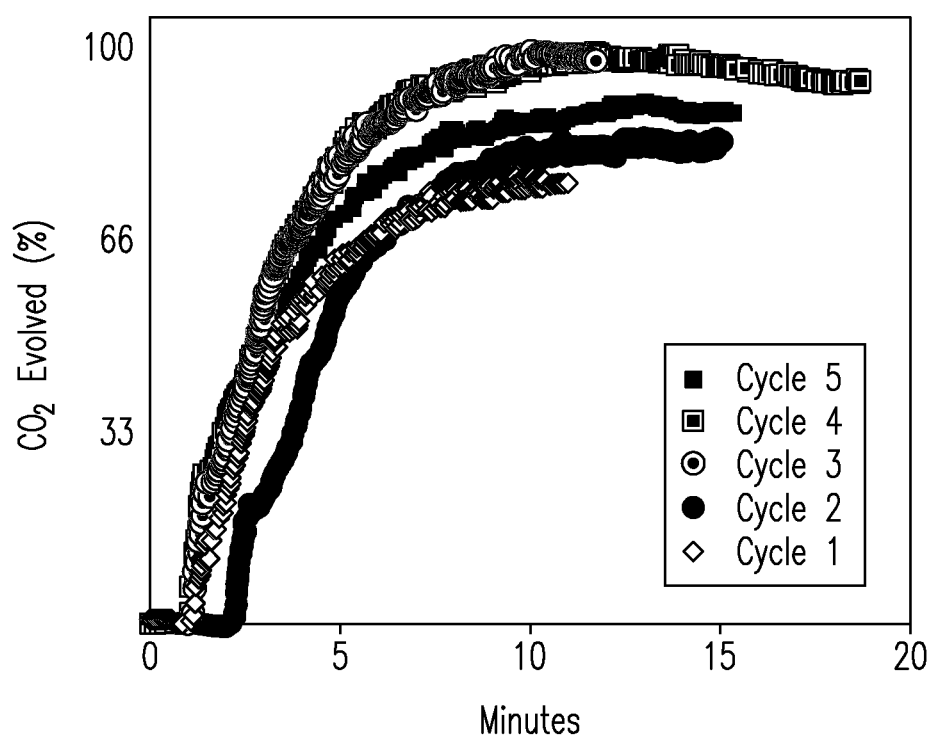
FIG. 5 shows cycling capacity for one embodiment of the invention.

Recycling of the $CO_2BOL$/PSAR process was demonstrated in a series of experiments using a non-volatile $CO_2BOL$ (i.e., TMG-6-OH). The alkanolguanidine was repeatedly carboxylated and then decarboxylated using heptane as the anti-solvent. FIG. 5 presents results. In the absence of anti-solvent, complete release of $CO_2$ at 75° C. is slow (~15 minutes). The same sample recycled and recarboxylated with $CO_2$ in the presence of a 1 molar equivalent of heptane showed complete release in less than 10 minutes. The process was repeated for 5 total cycles with no loss in activity or selectivity. Results indicate that PSAR performed at 75° C. with a non-volatile $CO_2BOL$ shows rapid and complete $CO_2$ release with no significant evaporative losses of the $CO_2BOL$.

Amount of anti-solvent carryover into the absorber is expected to be minimal with limited impact on $CO_2BOL$ performance. Presence of a non-polar anti-solvent does not prevent a $CO_2$-lean $CO_2BOL$ from capturing $CO_2$. Unlike acid-gas capture BOLs (e.g., $H_2SBOLs$) described in U.S. patent application Ser. No. 12/972,125 filed 17 Dec. 2010 [detailing a complete Anti-solvent Swing Regeneration (ASSR) process], BOLs described herein are not prevented (i.e., deactivated) from future or additional uptake of $CO_2$ and like gases when the anti-solvent (AS) is present. Thus, PSAR differs from the former ASSR process in that the alkylcarbonate salt is thermodynamically stronger and thus destabilized to a lesser extent by an anti-solvent compared to weak hydrosulfide salts that undergo rapid and complete gas release at 25° C.

Anti-Solvent Recovery

Anti-solvent can be separated from the gas-lean capture solvent following regeneration with separation processes known in the art including, but not limited to, e.g., centrifuging, coalescing, gravity separating, distilling, solvent extracting, freezing, cooling, hailing, and combinations of these various separation methods. In some embodiments, separation of anti-solvent from the $CO_2$-lean $CO_2BOL$ may be accomplished by phase separation of the anti-solvent phase from the lean BOL phase as performed for separation of $H_2SBOLs$ and hexadecane anti-solvent in co-pending U.S. application Ser. No. 12/972,125 filed 17 Dec. 2010. In some embodiments, a majority (>50%) of anti-solvent can be decanted or otherwise separated from the gas-lean BOL to reduce pumping and heating costs. In the exemplary embodiment, separation and recovery of the anti-solvent phase from the $CO_2$-lean DBU-propanol $CO_2BOL$ (20% carboxylated) phase was demonstrated at 25° C., but separation temperatures are not limited. At the exemplary separation temperature (25° C.), anti-solvent is immiscible in the $CO_2$-loaded BOL and phase separation occurs spontaneously upon $CO_2$ release and cooling to room temperature. Addition of anti-solvent (AS) lowers the thermal temperature required to release chemically bound gas from the SWIL (e.g., from 120° C. down to 75° C.) due to the change in polarity of the capture solvent and corresponding decrease in gas loading capacity. The reduction in regeneration temperature provides a thermal swing ($\Delta T$) for PSAR regeneration of a typical $CO_2BOL$ to 30° C. (e.g., 45° C.-75° C.). Here, 45° C. represents the initial gas absorption temperature and 75° C. represents the expected desorption temperature for the gas in the presence of AS. This small $\Delta T$ value provides an energy savings that permits a heat pump (e.g., an electrically-powered heat pump) to be introduced into any industrial process where quantities of heat are recovered or transferred. In some industrial embodiments, a heat pump is positioned between an absorber and a desorber. Introduction of a heat pump provides energy advantages compared with conventional thermal regeneration requiring a direct steam supply source, described hereafter.

Figure 6:
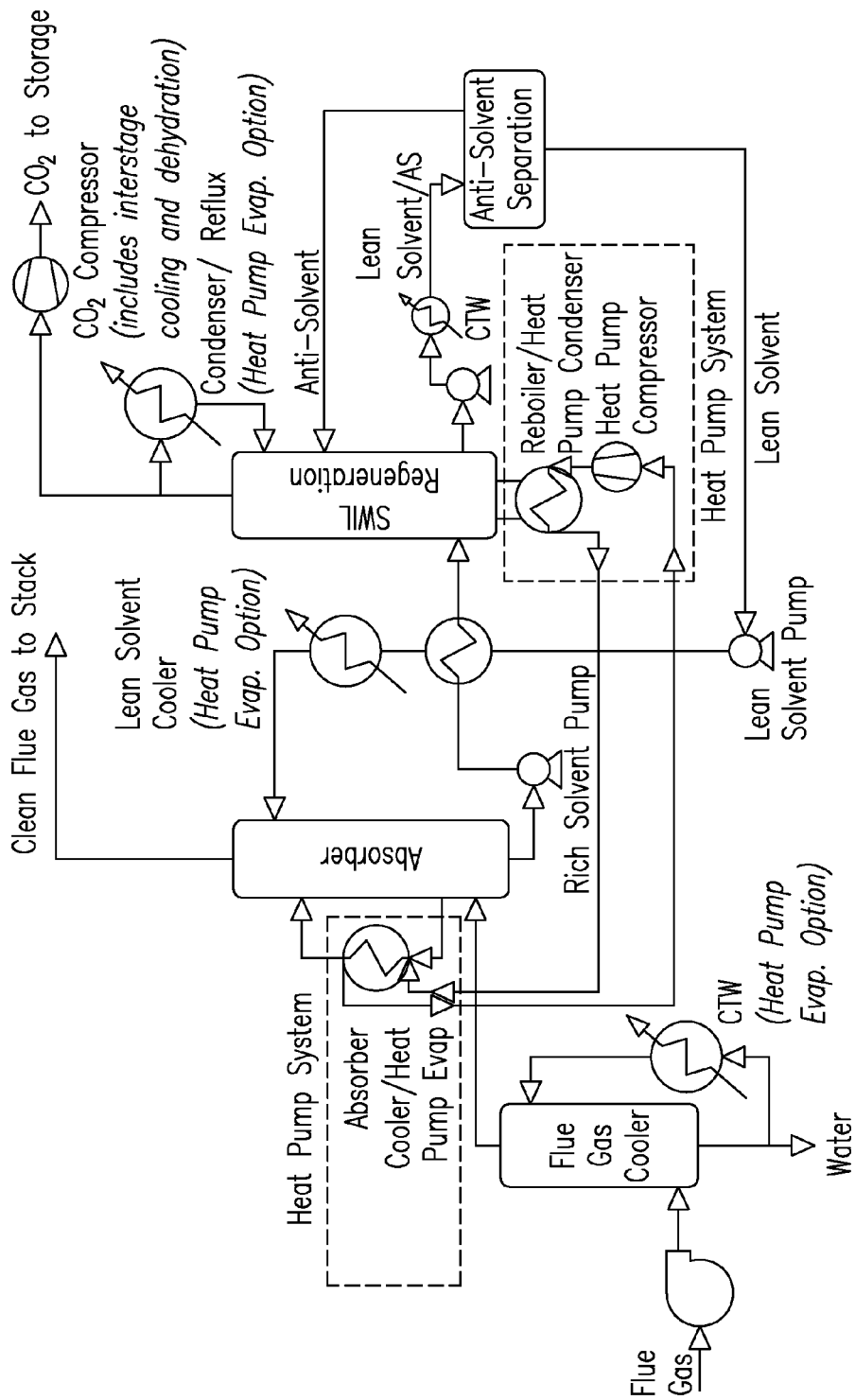
FIG. 6 is a flow diagram for a PSAR regeneration system for one embodiment of the invention.

FIG. 6 is a block flow diagram showing an exemplary PSAR process for regeneration of $CO_2BOLs$, according to an embodiment of the present invention. In the figure, flue gas is fed to the bottom of the absorption column. The flue gas is pre-cooled to 32° C. to remove water that would hydrate the $CO_2BOL$ solvent system. Sufficient moisture is removed at the dew point to minimize interference with the chemistry of the $CO_2BOL$. Another water removal step can be added as needed to further dehydrate in-flowing gaseous fluids provided the energy penalty associated with movement or transfer of fluids within the processing unit of operation is sufficiently low. Flue gas is contacted with lean (low $CO_2$ concentration) $CO_2BOL$ solvent in a countercurrent absorption column. Heat generated by $CO_2$ absorption heats the flue gas and heats and volatilizes solvent, and the remaining heat generated is removed by inter-coolers on the absorption column. The loaded $CO_2BOL$ solvent removed from the bottom of the absorption column is preheated by a cross-exchange with the hot, regenerated solvent from the regenerator. Heat is added to the regeneration column to supply heat of reaction for solvent regeneration and for other thermal losses. Heat removed from the intercoolers is usually rejected to ambient and regeneration heat can be supplied by a steam source, such as the intermediate pressure steam from a coal-fired power plant. Lowering the regeneration temperature facilitates using lower temperature heat sources for regeneration. In the figure, a heat pump is employed to increase the temperature of heat that is below the regeneration temperature. Heat recovered from the absorption column heats the evaporator of a vapor compression heat pump at approximately 40° C. Heat is delivered to the regenerator from the condenser of the heat pump at a temperature that is above the regeneration temperature. The heat pump compressor uses electricity, and the heat pump coefficient of performance (COP) is the ratio of heat recovered from the absorber divided by the power consumed by the compressor. The maximum theoretical COP is constrained by the Carnot efficiency, which decreases with increasing regeneration temperature. In other embodiments, the heat pump evaporator is heated by other low temperature sources, such as a regenerator overhead condenser (not shown), a flue gas discharge cooler (not shown), or a lean solvent cooler. In the instant embodiment, the mixture of lean $CO_2BOL$ solvent and anti-solvent is pumped from the bottom of the regenerator and cooled to approximately 40° C. This causes the solvent and anti-solvent to separate in two liquid phases, which allows recovery of the anti-solvent in a liquid separator (e.g., a coalescing liquid separator). Anti-solvent separated in the liquid separator is pumped back to the desorption column, and lean $CO_2BOL$ solvent is pumped back to the absorption column via a cross-flow recuperating heat exchanger and a separate (cooling) heat exchanger. Released $CO_2$ exits the top of the desorption column at near-atmospheric pressure and is sent to the $CO_2$ compression system for compression and dehydration using inter-stage dew-point coolers.

Regeneration Energetics

Heat Pump Design

Figure 7:
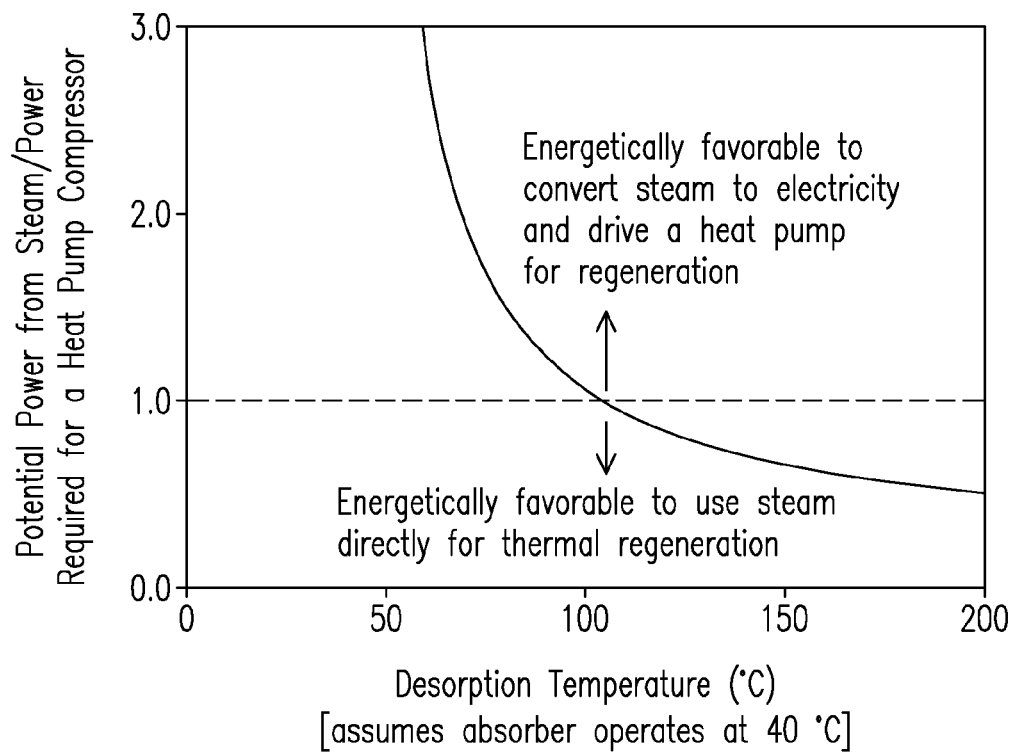
FIG. 7 shows energy and power economics from direct regeneration as a function of regeneration temperature in accordance with the invention.

FIG. 7 is a plot showing economics of energy and power resulting from direct regeneration in accordance with the invention as a function of regeneration temperature. A trade-off exists between using intermediate pressure steam (defined as a pressure above 5.6 psia) from a coal-fired power plant to provide heat for regeneration versus using some fraction of power from the plant to run a heat pump that can recover process heat at 40° C. In the figure, the abscissa represents the amount of power that could be generated from the steam used for regeneration divided by the amount of power needed by a heat pump to deliver an equivalent amount of heat. Thus, at values greater than 1, power generated from the steam exceeds the power consumed by the heat pump, resulting in a net power savings. As the regeneration temperature decreases, the COP of the heat pump increases and power consumption decreases. In the figure, the curve corresponds to an assumed 34% efficiency in converting steam to power in the power plant and a heat pump efficiency equal to 50% of the theoretical (maximum) Carnot efficiency. For these assumptions, direct heating with the low pressure steam (defined as a pressure above 1.07 psia) is energetically favored at regeneration temperatures greater than 110° C., while the heat pump provides a net power savings at regeneration temperatures below 110° C. Using intermediate pressure steam (i.e., above 5.6 psia) is preferred when retrofitting existing power plants with a carbon capture process in order to minimize impacts to existing processes and equipment. Intermediate pressure steam (i.e., above 5.6 psia) is the lowest temperature source above 120° C. that is in sufficient quantity from pulverized coal-fired power plants. As shown previously in FIG. 6, the lower regeneration temperature of $CO_2BOLS$ enables a process involving a heat pump. This flowsheet also precludes need for power plant steam, increases net power output, and represents a true retrofit application since the steam cycle is not impacted.

Energy Consumption Analysis

Evaluating the energy consumption of the $CO_2BOLs$—PSAR process depends on the specific $CO_2BOL$ solvent and anti-solvent, the absorber and regenerator operating temperature, and other process assumptions. TABLE 4 shows energy estimates for $CO_2$ removal and regeneration for several $CO_2BOL$ scenarios, compared with MEA baseline estimates.

TABLE 4

Potential Energy Savings with CO2BOLS with and without AS Effect, and with and without Heat Pump (CO2 compression not included).

| | MEA (30 wt % solution) | CO2BOLs without Antisolvent Effect | | CO2BOLs with Antisolvent Effect | |
| --- | --- | --- | --- | --- | --- |
| | | Conventional Thermal Swing | Heat Pump between Absorber/Stripper | Conventional Thermal Swing | Heat Pump between Absorber/Stripper |
| Temperature Required for Regeneration (° C.) | 120 | 120 | 120 | 75 | 75 |
| Thermal Energy Required for Regeneration (BTU/lb CO2)[1] | 1530[2] | 869 | 869 | 684 | 684 |
| $CO_2$ Removed | 90% | 90% | 90% | >90% | >90% |

TABLE 4-continued

Potential Energy Savings with CO2BOLS with and without AS Effect,
and with and without Heat Pump (CO2 compression not included).

| | MEA (30 wt % solution) | CO2BOLs without Antisolvent Effect | | CO2BOLs with Antisolvent Effect | |
|---|---|---|---|---|---|
| | | Conventional Thermal Swing | Heat Pump between Absorber/Stripper | Conventional Thermal Swing | Heat Pump between Absorber/Stripper |
| Electrical Energy Equivalent (work) Required for Overall $CO_2$ Removal (BTU/lb CO2)[3] | 520 | 295 | 280 | 232 | 140 |
| Electrical Energy Equivalent (work) Required for Overall $CO_2$ Removal (relative to MEA) | | 57% | 54% | 45% | 27% |

[1] $CO_2BOLs$ case (based on DBU-hexanol) assume 60% recuperation of the solvent sensible heat using a cross exchanger.
[2] NETL Baseline Report (Cost and Performance Baseline for Fossil Energy Plants Volume 1: Bituminous Coal and Natural Gas to Electricity, Revision 2, November 2010, DOE/NETL-2010/1397, US Department of Energy. National Energy Technology Laboratory, 2010). Value is sensitive to site conditions and flue gas composition,
[3] Energy (work) for regeneration calculated based on NETL flow sheet assuming LP steam temperature of 565° F., a condenser temperature of 101° F., and a conversion efficiency of 75%. Note that this is conservatively based on a retrofit with no changes to the steam turbines. (1 Btu/lb $CO_2$ = 0.3 Watt-hr/lb $CO_2$)

Equal molar DBU-hexanol mixtures with and without anti-solvent were used, with $CO_2$ loadings at equilibrium conditions presumed. For conventional thermal regeneration, low pressure (LP) steam was assumed to drive the regenerator, along with 60% recuperation of sensible heat through a cross exchanger positioned between the absorber and the regenerator. Energy savings are attributed to reduced latent loads due to the lower $CO_2BOL$ heat of absorption (−55.3 kJ/mol) and the lower sensible heat losses associated with higher loadings and lack of water in the solvent. In the table, the LP steam consumed is represented as equivalent lost electrical energy, or work, by assuming an energy conversion efficiency of 34% for a low-pressure turbine.

Based on estimates presented in the table, conventional thermal heating to regenerate a $CO_2BOL$ (i.e., with no PSAR added) requires a regeneration temperature of 120° C. to achieve 90% removal of $CO_2$ from the flue gas at 40° C. Equivalent electrical energy required is 57% of the NETL amine reference. Results show that for conventional thermal heating, use of a heat pump does not reduce the equivalent electrical energy much further because the regeneration temperature is too high (e.g., a 110° C. breakpoint is described above in reference to FIG. 7). This explains why heat pump designs are not used at thermal regeneration temperatures above about 110° C. Likewise, addition of anti-solvent offers a minor increase in process efficiency. Taking into consideration the addition of extra mass of the anti-solvent requires material cost, and energy associated with heating and pumping the extra fluid. Thus for $CO_2BOLS$ at PSAR regeneration temperature of 75° C. (i.e., temperature for 90% $CO_2$ removal), equivalent electrical energy reduces to 45% of the NETL baseline using conventional thermal regeneration, which is significantly lower than that achieved in the conventional art. In embodiments configured with a heat pump, anti-solvent addition results in an even larger increase in efficiency, as a lower regeneration temperature becomes available (75° C. vs 120° C.). Operation at the lower temperatures significantly increases the efficiency of the heat pump. For example, the heat pump and anti-solvent configuration further reduces the energy requirement to 27% of the NETL value. Thus, the invention enables lower temperature regeneration and, potentially, enhanced reductions in energy requirements by incorporation of a heat pump. For example, experiments have shown the unique combination of anti-solvent and heat pump use increases the energy efficiency of acid gas capture with SWILs compared with operations using heat pumps or anti-solvent addition alone. Energy estimates are based on demonstrated phenomenon for $CO_2BOLs$. With further optimization, regeneration temperatures even lower than 75° C. are feasible, which could reduce parasitic energy requirements even further.

Impact of Dehydration

Electricity estimates above do not include dehydration energy requirements. The exemplary embodiment assumes that removal of dew point water (i.e., direct contact cooling using process cooling water) to 2.8 wt % moisture is sufficient to minimize water interference with $CO_2BOL$ chemistry. Energy impact would thus occur only for cooling water recirculation pumps. Should additional dehydration of the flue gas be required prior to capture by the $CO_2BOLs$, a more energy-intensive water removal technique such as triethylene glycol (TEG) or another suitable water removal technique may be added. Addition of a TEG dehydration step between the direct contact cooler and the $CO_2$ absorption column would add a heat load of approximately 200 btu/lb $CO_2$ captured and reduce water content to a few parts per million.

Advantages

The present invention provides various advantages including, but not limited to: lower regeneration temperatures; lower specific heats compared with water-based systems; reduced water make-up rates (defined as the amount of water required to replace normal water losses including evaporation in industrial processes): large gas-loading capacities; reversible capture of acidic acid gases such as $SO_2$, a known poison to aqueous amine-based systems; lower evaporative losses of BOL solvents; increased lifetimes of capture solvents; improvements in process engineering; enhanced energy savings in industrial processes. Lower regeneration temperatures of the PSAR process allow use of low grade or waste heat sources, which can improve the efficiency of industrial processes. For example, heat produced in an absorber can be transferred in an economically viable process to a regenerator using a heat pump rather than using steam from the plant steam cycle. Use of a heat pump to provide desorption energy (instead of steam) makes this process attractive for retrofit applications because of its minimal impact on the plant steam cycle. Alternative strategies can include reducing the pressure of low-pressure (LP) steam used for regeneration allowing more energy content to be used for producing power. The combination of a non-aqueous solvent, lower desorption energies, and a small temperature difference between the absorption and desorption column reduces cooling water and makeup requirements. These advantages not only improve efficiency of the overall process but also simplify retrofitting to existing coal-fired power plants (e.g., pulverized coal power plants), gasification plants, cement kilns, and natural gas wells, and like emission gas processes. For example, combining the polarity swing-assisted regeneration (PSAR) approach with $CO_2BOLs$ is estimated to provide more than 42% energy savings over aqueous alkanolamine capture systems. PSAR regeneration further reduces temperatures required to regenerate gas-binding organic liquids (e.g., $CO_2BOLs$). The present invention also increases expected lifetimes of the gas-selective BOLs in industrial processes. Lower operating temperatures means less solvent loss due to evaporation and less thermal degradation. The present invention can also provide energy savings for industrial regeneration of gas-selective BOLs in industrial processes of up to about 65%, such that parasitic load penalties associated with capture of emission gases can be a fraction of current commercial systems. The technology can also be used in various processes and flow diagrams or as a retrofit to existing coal-fired power plants. Processes of the present invention can also be used to retrofit facilities that separate gases, as well as new facilities that separate gases including those that involve gas streams, e.g., emissions from pulverized coal plants. Use of a heat pump (instead of low pressure steam) provides desorption energy that makes this process attractive for retrofit applications because of its minimal impact on the plant steam cycle. Alternative strategies including reducing pressure of low pressure steam used for regeneration allows more energy content to be used for producing power. The combination of a non-aqueous solvent, lower desorption energies, and a small temperature difference between the absorption and desorption column reduces cooling water and raw/makeup requirements. And, less solvent loss can be expected from evaporation and reduced thermal degradation at temperatures employed by the present invention compared with conventional thermal regeneration at 120° C.

While preferred embodiments of the present invention have been shown and described, it will be apparent to those of ordinary skill in the art that many changes and modifications may be made without departing from the invention in its true scope and broader aspects. The appended claims are therefore intended to cover all such changes and modifications as fall within the scope of the invention.

What is claimed is:

1. A process characterized by polarity-swing assisted regeneration of a non-aqueous switchable $CO_2$ binding organic liquid, the regeneration including the step of:

heating a bound non-aqueous switchable $CO_2$ binding organic liquid—($CO_2BOL$) having $CO_2$ bound thereto in the presence of a liquid non-polar organic anti-solvent temperature less than 120° C. to perform the polarity swing to release the bound $CO_2$ from the $CO_2BOL$ and regenerate said $CO_2BOL$.

2. The method of claim 1, wherein the temperature is at or below 75° C.

3. The method of claim 1, wherein the heating includes heating with a geothermal heat source.

4. The method of claim 1, wherein the heating includes heating with a solar heat source.

5. The method of claim 1, wherein the heating includes heating with heat from a waste heat source.

6. The method of claim 1, wherein the heating includes heating with steam delivered from a steam source.

7. The method of claim 6, wherein the pressure of the steam is above 29.82 psia.

8. The method of claim 6, wherein the pressure of the steam is above 5.6 psia.

9. The method of claim 6, wherein the pressure of the steam is above 1.07 psia.

10. The method of claim 6, wherein the steam source is a condenser.

11. The method of claim 1, wherein the anti-solvent has a concentration defined by a mole fraction between about 0.05 and about 0.75.

12. The method of claim 1, wherein the anti-solvent has a concentration defined by a mole fraction between about 0.4 and about 0.5.

13. The method of claim 1, wherein the regenerating includes recovering heat from an evaporator of a heat pump and transferring the heat from the condenser of the heat pump to a regenerator.

14. The method of claim 1, wherein the regenerating includes recovering heat from an absorber.

15. The method of claim 1, wherein the regenerating includes recovering heat from an overhead condenser of a regenerator.

16. The method of claim 1, wherein the regenerating includes recovering heat from a flue gas cooler.

17. The method of claim 1, wherein the regenerating includes transferring heat with a heat pump operably coupled to one or more of: a condenser, an evaporator, an absorber, a cooler, a separator, a regenerator, or a reboiler.

18. The method of claim 1, further including the step of cooling the liquid after the polarity swing to promote a phase separation of the anti-solvent and the regenerated capture solvent.

19. The method of claim 18, wherein the separating includes a process selected from the group consisting of: centrifuging, coalescing, gravity separating, solvent extracting, freezing, cooling, and combinations thereof.

20. The process of claim 18, wherein the separating includes recovering the anti-solvent and the regenerated $CO_2BOL$ in separate phases or phase layers.

* * * * *